Patented July 7, 1925.

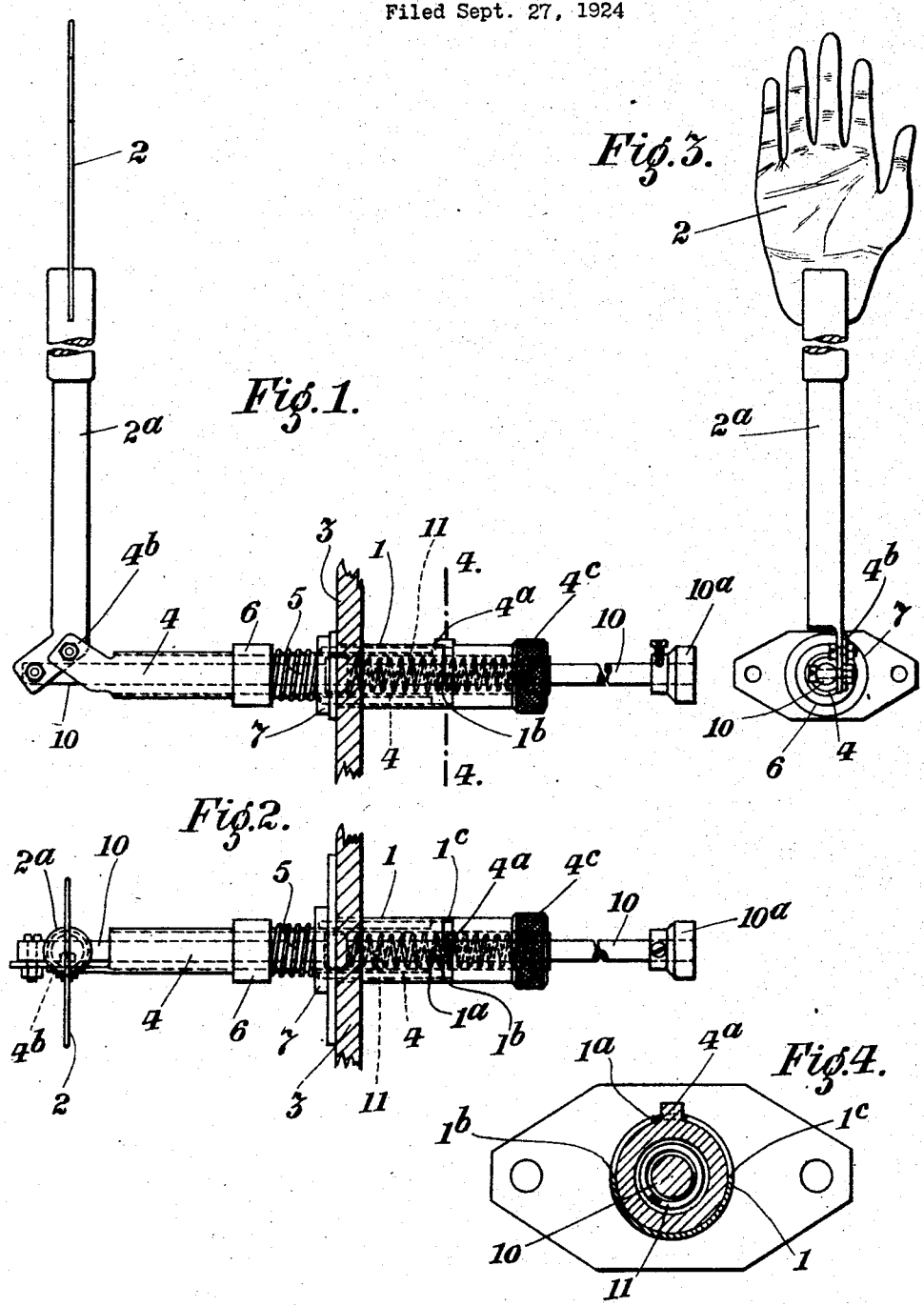

1,545,193

UNITED STATES PATENT OFFICE.

WILLIAM RICH MacKENZIE, OF BELFAST, IRELAND.

DIRECTION INDICATOR FOR VEHICLES.

Application filed September 27, 1924. Serial No. 740,335.

*To all whom it may concern:*

Be it known that I, WILLIAM RICH MACKENZIE, of 6 University Square, Belfast, Ireland, a subject of the King of Great Britain and Ireland, have invented certain new and useful Improvements Relating to Direction Indicators for Vehicles, of which the following is a specification.

This invention has for its object to provide a direction, or turning indicator for vehicles and is adapted to obviate the necessity of a motor car, or vehicle driver having to use his hand or arm to indicate to the public and pointsmen his intended movements. The object of the invention is also to provide a simple device for this purpose which will be compact and which can be readily seen and understood.

According to this invention the direction or turning indicator for vehicles is characterized by means whereby the indicator can be turned transversely to the direction of travel of the vehicle to indicate turning movements and whereby, when required, the indicator can be swung forwardly and backwardly, when vertically disposed and also when turned from the vertical position. The operating means for the indicator comprises a casing, means for turning the indicator and means for swinging the indicator forward and backward, all concentrically arranged and forming a compact, easily operated, and controllable device.

The invention will now be described with reference to the accompanying drawings whereon I have shown an example, as applied to an indicator for a private motor car.

Fig. 1 is a longitudinal elevation of the indicating device.

Fig. 2 is a plan view corresponding to Fig. 1.

Fig. 3 is a front elevation of the device.

Fig. 4 is a cross sectional view on the line 4—4 Fig. 1; to an enlarged scale.

Referring to the drawings.

In the example shown the device comprises an outer casing 1 adapted to be secured in a suitable position at the front of the vehicle and preferably so positioned that when the indicator, or indicator arm, or hand 2 is operated to the right as hereinafter described the indicator will show clearly from behind so that a following vehicle can observe same. Preferably the outer casing 1 is passed through a hole in the front screen 3 or dash of the motor car or vehicle, close to where the driver sits, with its inner end close to the driver's hand. Inside the casing 1, is a tube 4 which can be turned and (or) reciprocated therein. A spiral spring 5, inserted between the collar 6 formed on the inner tube and the flange 7 of the outer casing, exerts a forward push on the inner tube, such push being checked by a stud or projection 4ª, on the outside of the inner tube 4, which enters a notch 1ª in the outer casing 1, in which position of the stud or projection 4ª the inner tube 4 is in its forward position with the hand or indicator 2 held in upright position. An arm 2ª of suitable length, with the hand 2 at its end, forms the indicator and is hinged to the outside end 4ᵇ of the inner tube 4, being normally held in upright position by a rod 10 pivotally connected to the bent arm 2ᵇ of the indicator, the said rod passing through the inner tube 4 and being acted on by a spring 11 therein. The control rod 10 projects beyond the end of the inner tube 4 at its inner end and is provided with a knob or handle 10ª to enable the driver to pull the rod 10 towards him when required. When the driver pulls the knob 10ª of the control rod 10 towards him, he causes the indicator hand 2 to swing forward in the direction the car is going thus showing that he intends to move straight ahead. When the control rod knob 10ª is released, the spring means will cause the indicator 2 to resume the normal upright position. When the driver wishes to turn to the right or left he will grasp the hand grip 4ᶜ on the end of the inner tube 4 pulling it slightly towards him and releasing the stud, or projection 4ª from the notch 1ª in the outer casing 1, whereupon he will turn the indicator 2 to the right or to the left, according to the indication which he desires to give, the projection of the inner tube being preferably turned against a suitable stopper 1ᵇ or 1ᶜ, as the case may be, at each horizontal position, and the spring 5 which exerts a forward pull on the inner tube will act to retain the indicator 2 in the position to which it has been moved. When the indicator 2 is moved, for example to the right to indicate a right turn, it may, in this position, be used to indicate to a following vehicle that the driver desires the following vehicle to move ahead, this being done by reciprocating the control rod 10 which passes through the inner tube and controls the swinging of the indicator hand 2 forwardly from its right angled position relatively to the axis of the casing 1 and tube 4. When the turning movement of the car is completed the driver returns the indicator 2 to normal position by simply turning the inner tube 4 until the projection 4ᵃ thereon again enters the notch 1ᵃ in the outer casing.

The control rod 10 can be adapted to give all the indicator signals by simply making the spring 11, inserted between the control rod and the inner tube 4, of greater compression resisting strength than the spiral spring 5 between the collar 6 of the inner tube and the flange 7 of the outer casing, whereby when the rod 10 is pulled outwards the inner tube 4 is constrained to move therewith and the projection 4ᵃ is released from the notch 1ᵃ, thus allowing the indicator to be turned transversely to the direction of travel of the vehicle and to be swung forward and backward solely by means of the control rod 10.

The device hereinbefore described may also be modified to suit different kinds of vehicles and the location of the device relatively to the driver would also be selected with the object of the driver using it with the least effort and without altering his position.

The device as described is a mechanical one, but it could, if desired, be readily modified for electrical operation. The pull on the control rod 10, or equivalent, might be effected by the energizing of a magnet. The pull on the inner tube 4 might be similarly effected and the turning of the inner tube 4 to right or left might also be effected by means of magnets suitably energized and all under control from switches convenient to the driver's hand.

Having now fully described my invention what I claim and desire to secure by Letters Patent is:—

1. The combination with a vehicular direction indicator, having an indicating arm, of operating mechanism therefor, comprising a casing, rotatable means coaxial with the said casing, reciprocating means coaxial with the first mentioned means, and means connecting the rotatable and reciprocating means to the indicating arm in such a manner that the said arm can be swung in two planes.

2. The combination with a vehicular direction indicator, having an indicating arm, of operating mechanism therefor, comprising a casing, a rotatable tube coaxial with the said casing, a collar on the tube, a spring disposed between the said collar and the casing, reciprocating means coaxial with the said tube, and means connecting the said reciprocating means and tube to the indicating arm in such a manner that the said arm can be swung in two planes.

3. The combination with a vehicular direction indicator, having an indicating arm, of operating mechanism therefor, comprising a casing, rotatable means coaxial with the said casing, a reciprocating rod coaxial with the said rotatable means, a collar on the rod, a spring disposed between the said collar and rotatable means, and means connecting the said rotatable means and rod to the indicator arm in such a manner that the said arm can be swung in two planes.

4. The combination with a vehicular direction indicator, having an indicating arm, of operating mechanism therefor, comprising a casing, a rotatable tube coaxial with the said casing, a collar on the tube, a spring disposed between the said collar and the casing, a reciprocating rod coaxial with the said tube, a collar on the rod, a spring disposed between the said collar and the tube, and means connecting the said tube and rod to the indicator arm in such a manner that the said arm can be swung transversely, and in the direction of travel, of the vehicle.

5. The combination with a vehicular indicator, having an indicator arm, of operating mechanism therefor, comprising a casing, a rotatable tube coaxial with the said casing, a collar on the tube, a spring disposed between the said collar and the casing, a pivotal connection between the said tube and the indicating arm, a reciprocating rod coaxial with the said tube, a collar on the rod a spring disposed between the last mentioned collar and the tube, and a pivotal connection between the said rod and the indicating arm, the spring between the collar of the rod and the tube being of greater compression resisting strength than the spring between the collar of the tube and the casing so that the indicating arm can be swung in two planes by means of the said rod.

In testimony whereof I affix my signature in presence of two witnesses.

WILLIAM RICH MacKENZIE.

Witnesses:
ANDREW HAMILTON,
HARVEY WALTER ALLSOP.